Dec. 29, 1970             M. SHARKEY             3,551,270
BONDING AIR-IMPERVIOUS FLEXIBLE SHEETS USING AN ADHESIVE,
PERFORATED, INNER SHEET AND ARTICLE PRODUCED THEREBY
Filed Jan. 30, 1967

INVENTOR.
Melvin Sharkey
BY
Johnson and Kline
ATTORNEYS

United States Patent Office 3,551,270
Patented Dec. 29, 1970

3,551,270
BONDING AIR-IMPERVIOUS FLEXIBLE SHEETS USING AN ADHESIVE, PERFORATED, INNER SHEET AND ARTICLE PRODUCED THEREBY
Melvin Sharkey, 1614 Hereford Road, Hewlett, N.Y. 11557
Filed Jan. 30, 1967, Ser. No. 612,651
Int. Cl. B32b 3/10, 31/12; C09j 7/04
U.S. Cl. 161—113                                8 Claims

ABSTRACT OF THE DISCLOSURE

Lamination of flexible sheet materials in which an interior bonding sheet is provided on opposite sides with a layer of thermoplastic adhesive and sheets are bonded to said opposite sides without the formation of air bubbles between said sheets and the bonding sheet characterized in that the bonding sheet is provided with a multiplicity of spaced holes to accommodate any trapped air.

---

This invention relates to the field of laminating flexible sheet materials to each other by means of thermo-responsive dry adhesive layers and more particularly to the use of interior bonding sheets which are provided on opposite surfaces with a dry, non-tacky layer of composition which is rendered adhesive and tacky at elevated temperatures. Such bonding sheets are well-known in the laminating field for the heat-bonding of paper, plastic film, fiberboard, plywood and just about any flexible sheet materials to themselves or to each other.

While this process is in current use with much success, it does have one important disadvantage in cases where the sheet materials being united are not exceptionally pervious to air. Unless much care is taken during the bonding of such air-impervious sheets, air is trapped between the sheets and the inner bonding sheet forming bubbles which prevent the outer sheets from bonding completely and uniformly with the bonding sheet. These bubbles increase the overall thickness of the laminate, which is an important disadvantage in some cases, and produce an unsightly effect particularly in cases where the outer sheets are translucent, such as plastic film. However, most importantly, the air bubbles represent a defect or weakness in the bond between the sheets and an interference with the desired uniform and complete bond between the outer sheets and the inner bonding sheet.

While it is possible in some instances to carry out the laminating step slowly and with such care that the trapping of air is avoided, this is not possible in a continuous automatic operation and as a result there is a lack of uniformity between the final laminates which requires that they be carefully checked for defects and that the defective laminates be rejected.

It is the principal object of the present invention to provide a novel laminating process which results in the complete and uniform lamination of the surfaces of an interior bonding sheet to the surfaces of outer flexible sheets without the trapping of air bubbles therebetween to form novel laminates.

It is another object of this invention to provide laminates having an interior bonding sheet the surfaces of which are uniformly and completely bonded to outer flexible sheets to form laminates which are uniform in thickness, appearance and strength.

Figure 1:
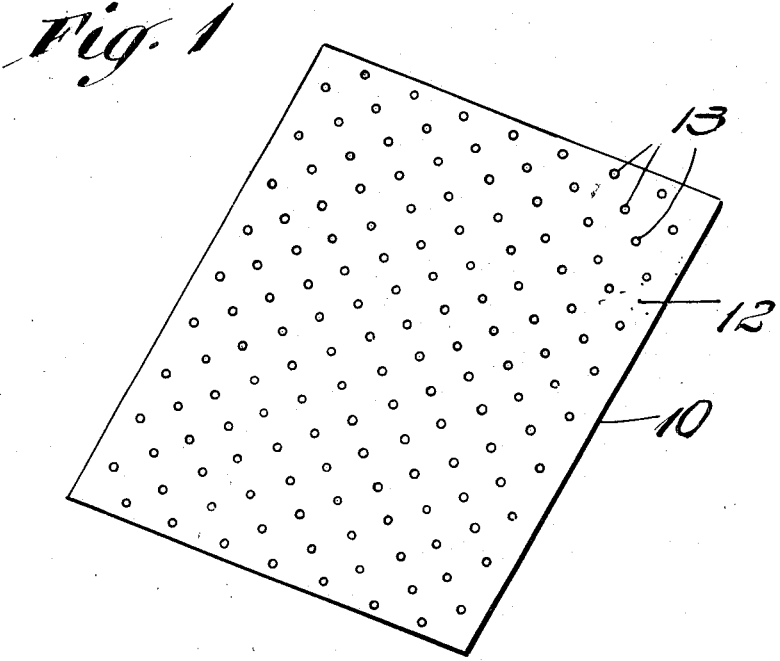
Figure 2:
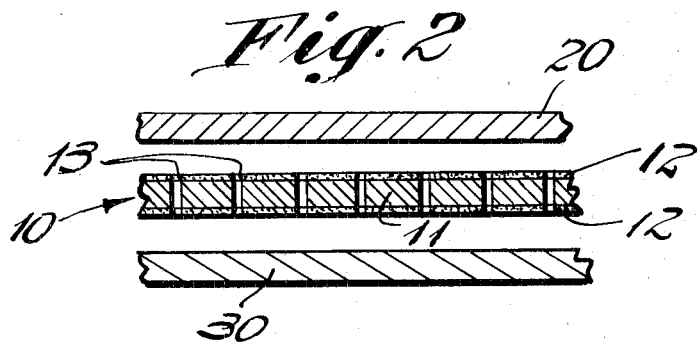

These and other objects and advantages of the present invention will be clear to those skilled in the art in the light of the present disclosure, including the drawings, in which:

FIG. 1 is a perspective view of an interior bonding sheet used according to the present invention, and FIG. 2 is a diagrammatic cross-section, to an enlarged scale, of an inner bonding sheet positioned between two outer sheets preparatory to the laminating step but spaced for purposes of illustration.

The objects and advantages of the present invention are accomplished by means of my discovery that when the inner bonding sheet is provided with a multiplicity of spaced transverse holes, such holes are able to accommodate any air which may be trapped between the sheets so that the complete surfaces of the inner bonding sheet are able to make contact with the surfaces of the outer sheets and a complete and uniform bond can be formed therebetween when the adhesive layers on the bonding sheet are activated.

Such bonding sheets make it possible to provide uniform laminates even in a continuous automatic laminating process since the holes in the bonding sheet will always contain some air and since the presence of larger amounts of trapped air in any particular laminate will be undetectable because the trapped air will be distributed in a number of the holes. Also, in cases where the inner bonding sheet has a relatively porous foundation, such as some papers, the trapped air will be forced into the foundation and further distributed across the bonding sheet. This has not previously been possible since the adhesive layers on the bonding sheet are impervious to air.

Referring to the drawings, FIG. 1 shows an inner bonding sheet 10 which is provided on opposite surfaces with a layer 12 of thermoplastic adhesive and which is further provided with a multiplicity of spaced holes 13 which are punched through the bonding sheet and adhesive layers to form air passages in the sheet.

The inner bonding sheet is formed in exactly the same manner as conventional bonding sheets having thermoplastic adhesive layers on opposite sides, except for the final step of punching holes therein. As shown in FIG. 2, the inner bonding sheet comprises a flexible foundation 11, such as paper, plastic film, plywood, fiberboard or the like, and carries layers 12 of thermoplastic adhesive on opposite surfaces. The layers 12 may be applied in conventional manner, alternately or simultaneously, by coating or spraying the foundation with a solution, dispersion, hot melt or other application of thermoplastic adhesive composition and then solidifying the coating such as by cooling or by evaporating the solvent to leave the dry, non-tacky layers 12 which are heat-activatable. Such heat-activatable compositions are generally resinous and are well-known in the art. Suitable compositions are those based upon vinyl resins such as polystyrene, polyvinyl butyral, vinyl ethers, or aldehyde condensates such as phenol-formaldehyde, urea-formaldehyde and melamine-formaldehyde. Natural resins and rubber materials and conventional thermoplastic glues are also suitable.

The formation of the holes in the inner bonding sheet is generally accomplished on a punching machine in conventional manner and the diameter and spacing of the holes depends upon the thickness of the bonding sheet. In most cases the bonding sheet is paper or plastic film having a thickness no greater than about 0.02 inch or 20 mils and the holes are no greater than about 0.125 inch in diameter and not less than about 0.016 inch in diameter, and preferably range between 0.063 inch and 0.032 inch in diameter. Similarly the spacing varies with the size of the holes, large holes being more spaced than smaller holes so that the volume of the air holes remains relatively constant. Where the bonding sheet is thin paper or plastic film and the holes are sized as discussed supra, the holes are present in a number within the range of from about 8 up to about 50 per square inch and preferably from about 20 to about 35 per square inch. Obviously, in cases where the bonding sheet is thick, such as plywood, fiberboard or the like, the openings may be as large as 0.5 inch in diameter and may be present at the rate of as few as about 10 per square foot.

The laminating process is accomplished by positioning the inner bonding sheet 10 between two substantially air-impervious outer sheets 20 and 30, as shown in FIG. 2, pressing the sheets into intimate surface contact and applying heat to activate the thermoplastic layers on the inner bonding sheet to render them tacky and cause them to bond to the contacting surface of each outer sheet. This process may be varied to some extent depending on the nature of the sheets being laminated. With thin, exceptionally flexible sheets it is sometimes desirable to draw the superposed sheets under tension over an edge such as the edge of a heated platen whereby heat is applied while the sheets are under a uniform line pressure and the trapping of air is minimized. However in most cases the sheets are laid flat on a smooth rigid surface and intimate contact between the sheets is accomplished by applying a similar smooth, rigid surface from above, as by compressing the sheets between heat-resistant glass using a vacuum pressure, if desired. As is well-known in the art, the sheets may also be compressed between heated rollers or may be compressed between heated platens of various sizes and under various pressures depending upon the thickness and nature of the sheets being laminated.

In all cases pressure is applied to insure intimate bonding between the sheets while the thermoplastic layers on the inner sheet are in heat-activated tacky condition. In most cases pressure is applied first and is then continued until heat is applied and the sheets are laminated. In some cases heat and pressure are applied simultaneously, as when the sheets are drawn over a heated edge. In other cases it may be desirable to first heat the bonding sheet and then bring it into pressure contact with the outer sheets while the adhesive layer is still tacky.

Heating is preferably accomplished by the use of a heated pressure means such as heated platens or heated rollers. However, the lamination may be accomplished in an oven, heated tunnel or by means of applied infrared radiation. In general the degree of heat required is not very high since most thermoplastic bonding layers are activated at temperatures within the range of from about 150° F. to about 250° F. However, some glues are rendered thermoplastic at temperatures as low as about 100° F. and other resinous layers require temperatures in the area of 300° F. Generally the applied heat is in excess of the softening temperature of the adhesive layer in order to insure quick and complete tackification.

The following example is given by way of illustration and should not be considered limitative.

An inner bonding sheet was prepared by applying a polyvinyl acetate solution in acetone to both sides of a sheet of 8 pound kraft paper in an amount to form dry thermoplastic layers each having a thickness of about 0.01 inch after evaporation of the acetone. The bonding sheet is then inserted in a punching machine where holes having a diameter of 0.032 inch are punched through the sheet at the rate of about 30 per square inch.

The bonding sheet is then positioned between two flexible sheets to be laminated, one being a fiberboard which is about 0.125 inch thick and the other being a sheet of 10 pound kraft paper. The superposed sheets are passed in the nip between rollers heated to a temperature of about 150° F. whereby the bonding layers are quickly heated above their softening temperature of 110° F. and adhere uniformly and completely to the outer sheets pressed thereagainst. Any trapped air is distributed in the holes in the inner sheet so that the final laminate is free of air bubbles between the surfaces of the inner and outer sheets and the laminate has a uniform caliper and apearance.

I claim:
1. A laminate of flexible sheet materials comprising a flexible inner bonding sheet having on both surfaces a dry, air-impervious layer of heat-tackifiable adhesive composition, said inner sheet being provided with a multiplicity of spaced holes uniformly distributed over said bonding sheet, and a flexible air-impervious outer sheet completely and uniformly bonded to each of the dry layers on said inner sheet, any air trapped within said laminate being distributed in the holes in said inner sheet and there being substantially no air trapped between the surfaces of said inner sheet and the surface of either of said outer sheets.

2. A laminate according to claim 1 in which the inner bonding sheet has a thickness no greater than about 0.02 inch and the holes have a diameter of between about 0.125 inch and about 0.016 inch and are present in an amount of between about 8 and 50 per square inch.

3. A laminate according to claim 2 in which the holes have a diameter of between about 0.063 inch and about 0.032 inch and are present in an amount of between about 20 and 35 per square inch.

4. The process of producing laminates of flexible sheet materials which comprises the steps of
   (a) applying to both surfaces of a flexible foundation sheet a dry, air-impervious layer of heat-tackifiable adhesive composition to form an inner bonding sheet;
   (b) perforating said inner bonding sheet with a multiplicity of spaced holes uniformly distributed over said bonding sheet;
   (c) positioning said perforated bonding sheet between two air-impervious outer sheets of flexible material to be bonded thereto; and
   (d) heating said layers of adhesive composition to render them tacky and applying pressure against said superposed sheets to cause said adhesive layers to form a complete and uniform bond with the contacting surfaces of said outer sheets to form said laminate, any air trapped within said laminate being distributed in the holes in said inner sheet and there being substantially no air trapped between the surfaces of said inner sheet and the surface of either of said outer sheets.

5. The process according to claim 1 in which the inner bonding sheet has a thickness no greater than about 0.02 inch and the holes have a diameter of between about 0.125 inch and about 0.016 inch and are present in an amount of between about 8 and 50 per square inch.

6. The process according to claim 1 in which the foundation of said inner bonding sheet is paper.

7. The process according to claim 1 in which heat is applied within the range of from about 150° F. and 300° F. to render said layers of adhesive composition tacky.

8. The process according to claim 1 in which the sheets are superposed and subjected to pressure to insure intimate surface contact prior to and during the application of heat.

References Cited
UNITED STATES PATENTS

| | | | |
|---|---|---|---|
| 1,479,044 | 1/1924 | Kirschbraun | 161—161 |
| 1,974,465 | 9/1934 | Lewis | 161—113 |
| 2,268,049 | 12/1941 | McGuire | 156—145X |
| 2,960,423 | 11/1960 | Kreibaum | 156—87X |
| 3,194,872 | 7/1965 | Garner | 161—113X |
| 2,132,907 | 10/1938 | Sperber | 156—753X |

JOHN T. GOOLKASIAN, Primary Examiner

G. W. MOXON II, Assistant Examiner

U.S. Cl. X.R.

156—87, 145, 252, 313; 161—161, 167

B228

PO-1050
(5/69)

UNITED STATES PATENT OFFICE
CERTIFICATE OF CORRECTION

Patent No. 3,551,270            Dated December 29, 1970

Inventor(s) Melvin Sharkey

It is certified that error appears in the above-identified patent and that said Letters Patent are hereby corrected as shown below:

Column 3, line 71, "srufaces" should read -- surfaces -- line 72, "apear-" should read -- appear- --. Column 4, line 43, "1" should read -- 4 --; line 48, "1" should read -- 4 --; line 50, "1" should read -- 4 --; line 53, "1" should read -- 4 --.

Signed and sealed this 23rd day of March 1971.

(SEAL)
Attest:

EDWARD M. FLETCHER, JR.            WILLIAM E. SCHUYLER, JR.
Attesting Officer                    Commissioner of Patents